US009043416B2

(12) United States Patent
Faulkner

(10) Patent No.: US 9,043,416 B2
(45) Date of Patent: May 26, 2015

(54) APPARATUS WITH SWITCH GENERATING SMS MESSAGE

(76) Inventor: Richard Faulkner, Stoke on Trent (GB)

( * ) Notice: Subject to any disclaimer, the term of this patent is extended or adjusted under 35 U.S.C. 154(b) by 79 days.

(21) Appl. No.: 13/510,829

(22) PCT Filed: Nov. 19, 2010

(86) PCT No.: PCT/GB2010/051929
§ 371 (c)(1), (2), (4) Date: Jun. 18, 2012

(87) PCT Pub. No.: WO2011/061543
PCT Pub. Date: May 26, 2011

(65) Prior Publication Data

US 2012/0246253 A1 Sep. 27, 2012

(30) Foreign Application Priority Data

Nov. 20, 2009 (GB) .................................. 0920344.9

(51) Int. Cl.

| | |
|---|---|
| ***G06F 15/16*** | (2006.01) |
| ***G06F 15/173*** | (2006.01) |
| ***G06Q 30/04*** | (2012.01) |
| *H04L 12/58* | (2006.01) |
| *H04L 29/08* | (2006.01) |

(52) U.S. Cl.
CPC ............ *G06Q 30/04* (2013.01); *H04L 12/5895* (2013.01); *H04L 67/125* (2013.01)

(58) Field of Classification Search
USPC ................................................. 709/206, 224
See application file for complete search history.

(56) References Cited

U.S. PATENT DOCUMENTS

| | | | | |
|---|---|---|---|---|
| 7,409,428 | B1 * | 8/2008 | Brabec et al. | 709/206 |
| 2002/0129107 | A1 * | 9/2002 | Loughran et al. | 709/206 |
| 2002/0184122 | A1 * | 12/2002 | Yamaguchi et al. | 705/30 |
| 2005/0240417 | A1 * | 10/2005 | Savage | 705/1 |
| 2006/0294031 | A1 * | 12/2006 | Muller et al. | 705/404 |
| 2008/0263169 | A1 * | 10/2008 | Brabec et al. | 709/206 |
| 2009/0254203 | A1 * | 10/2009 | Gerold et al. | 700/87 |
| 2009/0298480 | A1 * | 12/2009 | Khambete et al. | 455/414.1 |
| 2010/0273450 | A1 | 10/2010 | Papineau et al. | |

FOREIGN PATENT DOCUMENTS

| | | | |
|---|---|---|---|
| EP | 1557742 | A1 | 7/2005 |
| EP | 2425340 | A1 | 3/2012 |
| KR | 20090037501 | A | 4/2009 |

OTHER PUBLICATIONS

UK Intellectual Property Office Examination Report dated Sep. 12, 2012 issued for corresponding application No. GB1210807.2 published as GB2488301.

European Patent Office Examination Report dated Oct. 25, 2013 issued for corresponding application No. EP10787872.0 published as EP2502191.

* cited by examiner

*Primary Examiner* — Edward Kim
(74) *Attorney, Agent, or Firm* — Fraser Clemens Martin & Miller LLC; James D. Miller

(57) ABSTRACT

Apparatus for selectively enabling functionality of a machine having a first state, wherein some or all of the functionality associated with the machine is selectively disabled, the apparatus comprising: an input for a user to select the disabled functionality; a transmitter for sending an SMS message in response to a user input at the input means; a controller for generating a control signal associated with the sending of the SMS message, the control signal configured to place the machine in a second active state in which some or all of the functionality associated with the machine is selectively enabled.

18 Claims, 1 Drawing Sheet

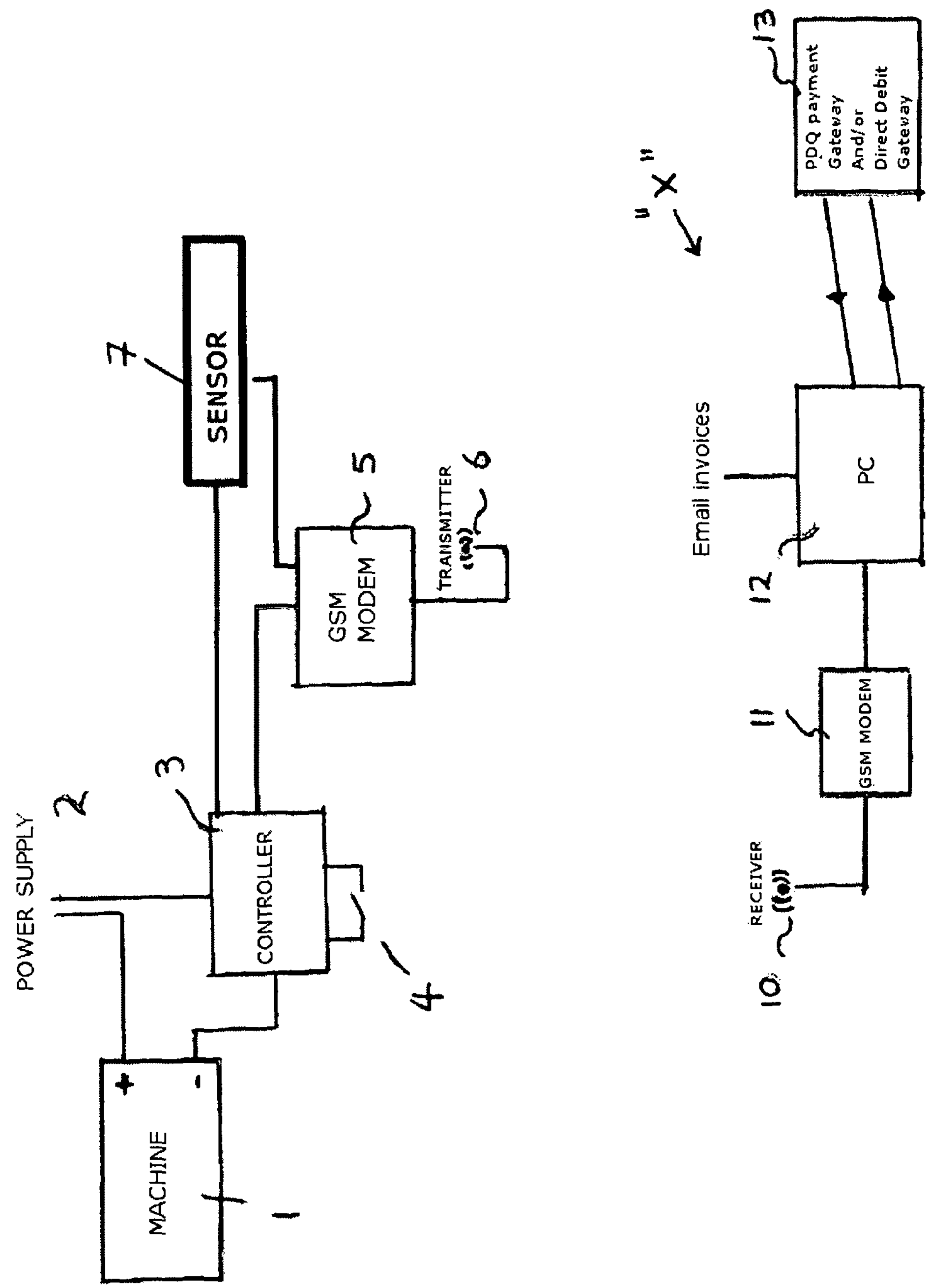
MACHINE
POWER SUPPLY
CONTROLLER
SENSOR
GSM MODEM
TRANSMITTER
RECEIVER
GSM MODEM
PC
Email invoices
PDQ payment Gateway And/or Direct Debit Gateway
"X"
1
2
3
4
5
6
7
10
11
12
13

APPARATUS WITH SWITCH GENERATING SMS MESSAGE

TECHNICAL FIELD

The present invention relates to an apparatus with a switch generating an SMS message.

BACKGROUND TO THE INVENTION

It is sometimes desirable to rent apparatus, such as rental of beauty treatment machines to a beauty salon, on a "pay as you go" or "pay per use" basis. In such circumstances it is desirable to know when the apparatus is in use. In particular, it is desirable to be able to accurately determine when a particular apparatus is in use and the number of times the apparatus has been used.

It is known in other applications to include a meter or counter which indicates the number of times an apparatus has been used. However, such counters often require that a person physically inspects the meter to record a reading, which then has to be collated and compared to previous readings to determine the number of uses between readings. Such a method is time consuming and prone to errors as it requires an element of human interaction.

It is also known to pay for services using a swipe card or "top-up" card which can be programmed to store the number of uses. Such systems require expensive infrastructure to implement, with card readers and expensive swipe cards or fobs for each machine. Furthermore, loss of the cards or fobs requires replacements to be purchased, further adding to the costs.

It is difficult however to monitor when the machine is being used and so charge only for when it is used.

SUMMARY OF THE INVENTION

To mitigate at least some of the above problems in the prior art, the invention may allow an apparatus to be used, and the user charged each time the apparatus used.

According to the present invention there is provided an apparatus with a switch generating an SMS message comprising:

a) a machine b) a controller configured to control operation of the apparatus, c) a switch to operate the controller, d) means to generate and transmit an SMS message to a remote location upon operation of the switch, and e) a sensor to sense transmission of an SMS message, said sensor generating a control signal instructing the controller to control the apparatus only when a SMS message has been sent, in use a user requiring to use the apparatus operates the switch and a SMS message is generated, and the sensor, upon sensing transmission of the SMS message, allowing the apparatus to be operated by the controller.

Preferably a receiving station is provided at the remote location to receive a SMS message sent by the means to transmit an SMS message, and said receiving station initiates a payment for use of the apparatus. Preferably the receiving station initiates a payment through a banking system and/or generates an invoice.

Preferably the apparatus is electrical, such a beauty treatment machine.

Preferably the SMS message contains one or more identifiers to identify the apparatus which sent the SMS.

There is also provided apparatus configured to selectively enabling functionality of a machine having a first state, wherein some or all of the functionality associated with the machine is selectively disabled, the apparatus comprising: input means for a user to select the disabled functionality; a transmitter for sending a message in response to a user input at the input means; a controller for generating a control signal associated with the sending of the message, the control signal configured to place the machine in a second active state in which some or all of the functionality associated with the machine is selectively enabled.

Preferably, the message is an SMS message. Alternatively the message may be sent by GRPS, WiFi, a standard phone line, 3G or any other suitable telephony standard.

Other aspects of the invention will become apparent from the appended claim set.

BRIEF DESCRIPTION OF THE DRAWINGS

Further aspects, features and advantages of the invention will be apparent from the following description of preferred embodiments, presented by way of example only, and by reference to accompanying drawings wherein:—

FIG. 1 is a schematic drawing of an apparatus according to an embodiment of the invention.

DESCRIPTION

Referring to the drawing there is shown an apparatus with a switch generating an SMS message.

An electrical apparatus for controlling a beauty treatment machine 1 is provided. Machine 1 is powered from a mains power supply 2. In further embodiments, the machine 1 may have its own power source.

By default the machine 1 is in a normal inactive state where some or all of the functionality associated with the machine is selectively disabled. For example, the beauty treatment machine may be a toning machine, and in the normal state, the toning facility may be switched off. Alternatively the normal state may be when the power source to the machine is selectively turned off or the machine may be powered but the toning element is not turned on.

The machine 1 has a further active state, where the functionality associated with the machine is selectively enabled. In the above example, the power may be switched on or alternatively the toning element is switched on.

A controller 3 is provided to control operation or signal to the machine/apparatus 1, e.g. to turn the apparatus "on" or to allow certain operations to be executed.

An input or switch 4 is provided which is configured to operate the controller 3. The input 4 in an embodiment is a mechanical switch which when actuated activates the controller 3. In further embodiments the input 4 may be a keypad, touch pad, touch screen interface etc, which allows a user to input a signal to operate the apparatus 1.

A transmission module in the form of a GSM modem 5 with transmitter 6 is provided to transmit an SMS message to a remote location "X" upon operation of the switch 4. In further embodiments, the modem 5 and transmitter 6 may transmit messages using other mobile telephony standards. The GSM modem 5 and transmitter 6 are preferred as they allow for low cost sending of SMS messages.

Preferably, the SMS message generated and transmitted contains an identifier associated with the particular apparatus 1. The identifier is preferably a unique identifier for the apparatus 1.

Several different machines, which may have the same or different functionality, can be provided in communication with a single GSM modem 5 and transmitter 6. This allows costs to be reduced, and may be used in a salon which may have several machines. To identify which of the machines is being used, the generated SMS message preferably contains a machine identifier. Alternatively (such as when it is not necessary to distinguish between multiple machines using the same modem) the apparatus 1 is identified from the GSM modem which sent the message, such as via header information. To prevent fraudulent messages being sent to the remote location "X" optionally a security code is contained within the SMS message.

Further, a single apparatus 1 may be configured to perform more than one task. The user selects which task they wish the machine to perform via the input 4, and an identifier of the task performed is also transmitted within the SMS message. For example, a beauty machine 1 may contain a massager and a applicator to deliver electrical pulses to a user. The user may select one or both features. The SMS message contains an identifier to state which feature has been selected for activation.

The remote location "X" is typically a central location associated with the supplier/owner of the apparatus 1. The GSM modem 5 and transmitter 6 are configurable to send messages to different locations (not shown) if desired.

A sensor 7 is provided to determine the transmission of an SMS message. The sensor 7 generates a control signal instructing the controller 3 to control the apparatus (e.g. turn on the machine and/or allow certain functionality to be selectively enabled) only when a SMS message has been sent. If the machine 1 has several features which have been selected disabled, then the control signal indicates which feature(s) are to be selective enabled. If the sensor 7 has determined that no SMS message has been sent the controller 3 prevents use of the apparatus, such as by leaving the apparatus 1 is a "power off" state, or by selectively disabling certain functionality associated with the machine.

A receiving station is provided at the remote location to receive a SMS message sent by the modem 5 and transmitter 6. The receiving station includes a receiver 10 and GSM modem 11, a computer 12 which can e-mail invoices or initiate a payment through a banking system through a PDQ Payment Gateway and/or Direct Debit Gateway 13. Preferably, if the SMS message contains a device identifier and/or an identification of the functionality selected for the apparatus, the computer 12 identifies the device and/or functionality and determines the appropriate payment required. If desired, different charges can be levied according to what functionality has been selected. Preferably, if a security code is present in the SMS message the computer 12 verifies the security code to determine if the message received is genuine before processing invoices or initiating payment.

In use, the apparatus 1 is in a normal first, inactive, state. In the first state, the power supply 2 may be selectively disconnected from the apparatus 1 or the apparatus 1 may have limited functionality. A user, wishing to use the apparatus 1 operates the input 4 to indicate that they wish the apparatus 1 to perform a certain functionality. The controller 3 detects the user input from the input 4 and a SMS message is generated by the GSM modem 5. The SMS message generated optionally contains an identifier and security code. The generated SMS message is transmitted to the remote location via the transmitter 6. The sensor 7, upon sensing transmission of the SMS message, sends a control signal to the controller 3 allowing the apparatus 1 to be operated by the user. When the controller 3 receives the control signal from the sensor 7 the apparatus 1 enters an "active" state, where the functionality associated with the machine 1 is selectively enabled. As stated above, the control signal can selectively turn on different functionality depending on what options are present in the machine. In the active state the power supply may be selectively connected to the apparatus 1, or further functionality enabled. Accordingly, the apparatus 1 can then be used by the user. If the SMS message is not sent, e.g. due to lack of a local network, the controller 3 will not allow the apparatus 1 to enter the active state and accordingly the apparatus does not function.

Once the receiving station has received an SMS message, preferably the computer 12 verifies the SMS message and identifies the apparatus 1 which has sent the SMS message. Therefore, the computer 12 recognises that the apparatus 1 has been operated and generates an invoice for the user, or collects payment from the user through PDQ Payment Gateway and/or Direct Debit Gateway 13.

Many apparatuses can be installed in different locations such as different beauty salons. Each apparatus sends to a single remote location "X" a unique SMS message identifying itself, preferably via an identifying code. Every time a given apparatus is used, then its SMS message is sent to the computer 12 so payment can be initiated. Optionally, rather than initiate payment each time an apparatus is used, payment is initiated after predetermined number of uses, e.g. after 10 uses of the apparatus 1.

The invention may take a form different to that specifically described above. For example the controller could allow operation of a mechanical rather than electrical apparatus. The computer 12 may also generate paper invoices.

In a further embodiment, the computer 12 sends a conformation message to the controller 3 via the GSM modems 11 and 5, when the computer 12 has confirmed receipt of a valid SMS message associated with the machine 1. The conformation message is equivalent to the control signal and upon receipt of the conformation message, the controller 3 selectively places the apparatus 1 in the active state e.g. by selectively engaging the power supply.

Alternatively the message may be sent by GRPS, WiFi, a standard phone line, 3G or any other suitable telephony standard.

The above invention may be provided as a separate device configured to be connected to an existing machine 1, such as beauty treatment machine, to selectively turn the machine from the inactive to active state. Alternatively, the invention may be provided as part of a machine, such as within the casing or housing element.

Further modifications will be apparent to those skilled in the art without departing from the scope of the present invention.

The invention claimed is:

1. Apparatus which selectively enables functionality of a machine having a first state when some or all of the functionality associated with the machine is selectively disabled, the apparatus comprising:

an input for a user to select a disabled functionality;

a transmitter which sends an SMS message in response to the user selection of disabled functionality at the input;

a controller; and a sensor which generates a first control signal in response to detection of the sending of the SMS message by the transmitter, the first control signal configured to instruct the controller to place the machine in a second active state in which the disabled functionality selected by the user at the input is selectively enabled.

2. Apparatus of claim 1 wherein the SMS message is transmitted to a remote server configured to monitor usage of the machine from the received SMS messages.

3. Apparatus of claim 1 wherein the apparatus further comprises receiving means to receive a message from an external source and to generate a second control signal in response to the receipt of a message.

4. Apparatus of claim 1 wherein the transmitter comprises an SMS message generator configured to include specific content in the message.

5. Apparatus of claim 4 wherein the SMS message contains one or more identifiers associated with the apparatus.

6. Apparatus of claim 4 wherein the SMS message contains a security code.

7. Apparatus of claim 1 wherein the SMS message contains an identifier associated with the machine

8. Apparatus of any of claim 4 wherein the SMS message contains an identifier associated with the functionality to be enabled in the second state.

9. Apparatus of claim 8 wherein the first control signal selectively enables the functionality identified in the SMS message.

10. Apparatus of claim 2 wherein the remote server comprises a computer to receive the SMS message configured to identify the originating machine from the content of the SMS message.

11. Apparatus of claim 2 wherein upon receipt of an SMS message the remote server initiates payment for use of the machine, and/or generates an invoice.

12. Apparatus of claim 1 wherein the transmitter comprises the controller.

13. Apparatus of claim 1 further comprising the machine whose functionality is selectively enabled.

14. Apparatus of claim 1 wherein the machine is a beauty machine.

15. Apparatus of claim 1 wherein the input is a mechanical switch which effects connection and disconnection of the controller to a power supply.

16. A method of selecting enabling functionality of a machine having functionality which is selectively enabled and disabled, the method comprising:

placing the machine in a first state where some or all of the functionality associated with the machine is selectively disabled;

a user selecting disabled functionality to be enabled via a user input;

in response to the selection sending, from the machine to an external server, an SMS message via a transmitter; and generating a first control signal at the machine, said first control signal generated in response to the sending of the SMS message by the transmitter, the first control signal configured to place the machine in a second active state in which some or all of the disabled functionality selected at the input is selectively enabled, and placing the machine in the second active state.

17. The method of claim 16 wherein the method further comprises the steps of a central server receiving the SMS message and generating an invoice and/or processing payment in response to the receipt of the message.

18. The method of claim 16 wherein the method further comprises a central server sending a conformation message to the machine upon receipt of the SMS message and generating a second control signal in response to the receipt of the SMS message from the central server.

* * * * *